US006416035B1

United States Patent
Welteroth et al.

(10) Patent No.: US 6,416,035 B1
(45) Date of Patent: Jul. 9, 2002

(54) THROTTLE BODY

(75) Inventors: Peter Welteroth, Eitorf; Gerd Bornmann, Hochheim; Wolfgang Sauerschell, Oberursel; Nouhad Bachnak, Frankfurt, all of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/615,913

(22) Filed: Jul. 13, 2000

(30) Foreign Application Priority Data

Jul. 16, 1999 (DE) .......................................... 199 32 878
Jul. 16, 1999 (DE) .......................................... 199 32 881

(51) Int. Cl.[7] .............................................. F16K 31/04
(52) U.S. Cl. ................................. 251/129.12; 123/399
(58) Field of Search ....................... 251/129.11, 129.12, 251/129.13; 137/554; 123/399, 361

(56) References Cited

U.S. PATENT DOCUMENTS

| 5,016,588 A | * | 5/1991 | Pagdin et al. ................ 123/399 |
| 5,113,824 A | * | 5/1992 | Haubner ....................... 123/399 |
| RE34,906 E | * | 4/1995 | Tamaki et al. ............... 123/399 |
| 5,490,487 A | * | 2/1996 | Kato et al. ................... 123/399 |
| 5,868,114 A | * | 2/1999 | Kamimura et al. .......... 123/399 |
| 5,996,554 A | * | 12/1999 | Tojo et al. ................... 123/399 |
| 6,079,210 A | * | 1/2000 | Pintauro et al. .............. 60/602 |
| 6,244,565 B1 | * | 6/2001 | McDonnell et al. ... 251/129.12 |

OTHER PUBLICATIONS

Specification Egas–T Actuator, p. 4 point 2.2, picture p. 6 Mannesmann VDO; Sep. 13, 1999.

* cited by examiner

Primary Examiner—William C. Doerrler
Assistant Examiner—Patrick Buechner
(74) Attorney, Agent, or Firm—Martin A. Farber

(57) ABSTRACT

In a throttle body with a Torquer drive, the rotor of the drive motor is seated directly on the shaft (14) of the throttle butterfly (16). In order to achieve permanent axial retention of the shaft in combination with simplicity of assembly, the rotor is press-fitted on to the shaft (14), a retaining washer (52) is provided between the throttle butterfly (16) and the rotor, the retaining washer being fixed axially on the shaft (14) or on a throttle housing (12) and engaging with a defined axial play in a gap (32) on the other element, and the two axial, housing-side contact surfaces of the retaining washer (52) being formed by a fastening plate (56) screwed to the housing (12) and by a stop (54) provided on the housing (12). The narrow axial retention device allows rotor-side arrangement for simpler assembly in combination with a short and rigid throttle-butterfly shaft (14).

11 Claims, 3 Drawing Sheets

THROTTLE BODY

FIELD AND BACKGROUND OF THE INVENTION

The invention relates to a throttle body with a Torquer drive, in which the rotor of an electric drive motor is seated directly on the shaft of the throttle butterfly. The invention furthermore relates to a method for assembling such a throttle body.

In comparison with motors coupled to the throttle-butterfly shaft via transmission stages, such an arrangement of the rotor requires very few components and also requires less installation space. However, allowance must be made for the fact that the throttle butterfly is excited to vibrate. Whereas, in the case of solutions with a separately mounted rotor, a pin which is anchored in the housing of the throttle body and engages with a defined play in a circumferential groove on the throttle-butterfly shaft, may be sufficient for the axial retention of the shaft, the high mass of the rotor in a throttle body with a Torquer drive leads to very high unit surface loading under the vibrational movements, with the result that wear of the axial contact surfaces and hence an increase in the axial play can rapidly occur given small supporting surfaces. The throttle butterfly becomes stiffer and, in the most extreme case, may stick. As a further problem with the axial fixing of the throttle-butterfly shaft, there is the fact that there is only a limited amount of axial installation space available since, in addition to the axial retention means and the rotor, it is also necessary to provide a potentiometer for detecting the actual position of the throttle butterfly and the rolling-contact bearings for supporting the throttle-butterfly shaft in the throttle housing. Although it is possible, in principle, to arrange these elements on both sides of the throttle butterfly in the housing, this makes assembly more difficult.

SUMMARY OF THE INVENTION

The object of the present invention is to provide an axial retention means for a throttle body with a Torquer drive which can withstand the higher stresses and is simple to assemble.

According to the invention, the object is achieved by a throttle body with a Torquer drive, in which the rotor of an electric drive motor is press-fitted directly on to the shaft of the throttle butterfly, an axial retention means in the form of a retaining washer being provided between the throttle butterfly and the rotor, said retaining washer being fixed axially on the shaft or on a throttle housing and engaging with a defined axial play in a gap on the other element, and the two housing-side axial contact surfaces of the retaining washer being formed by a fastening plate screwed to the housing and by a stop provided on the housing.

The solution according to the invention offers first of all the advantage that the retaining washer provides large-area contact with the two flanks of the gap, with the result that the unit surface loading and hence wear is low despite the increased inertia forces due to the electric-motor rotor seated on the throttle-butterfly shaft, thereby ensuring a constant axial play over the service life.

Axial fixing on the housing by means of a screwed fastening plate furthermore ensures that the axial installation space required is only very small, making possible the arrangement of the axial retention means between the throttle butterfly and the rotor, which is advantageous for assembly reasons, with a short and hence rigid throttle-butterfly shaft.

In a first preferred embodiment of the invention, the retaining washer is seated with a defined axial play on the shaft in a circumferential groove and is fixed without axial play on the housing side by means of the fastening plate.

In this embodiment, the axial play can be maintained very accurately with low outlay in terms of manufacture since, for a known thickness of the retaining washer, all that is required is to cut a circumferential groove of defined width into the circumference of the throttle-butterfly shaft. The retaining washer can, for example, be designed as a C washer and be inserted laterally into the groove or be implemented by means of two half-shells.

The fastening plate and the retaining washer can furthermore be of one-piece design, the shaft opening being designed in the shape of a keyhole. The advantage of this embodiment lies in the further slight reduction in the axial installation space and in the reduction in the number of parts. Here, the widened region of the keyhole serves for the introduction of the shaft before installation in the throttle housing. A discontinuous design of the keyhole opening is also conceivable.

As an alternative to a circumferential groove provided in the shaft provision is made in another embodiment of the invention for the retaining washer to be fixed axially on the shaft circumference and the gap at the housing to be defined by an axial stop and one flank of the fastening plate. The axial stop can be provided with a contact disk.

In this variant, the axial play is obtained from the difference between the axial spacing of the housing stop from the contact surface of the fastening plate and the thickness of the retaining washer. The firm seating of the retaining washer on the throttle-butterfly shaft is preferably established by means of a welded joint, a press fit also being possible in principle, although this may require a thicker retaining washer to ensure that the washer is seated securely on the shaft.

The present invention also relates to a method for assembling a throttle body of the type described above. According to the invention, the throttle body is first fully preassembled, and the rotor is press-fitted on to the shaft only at the final stage before the throttle housing is closed.

The advantage of this assembly method is that the throttle-butterfly shaft can be inserted from the rotor side into the bearings, which are generally designed as needle bearings, and the axial retention means and the potentiometer can then be installed without being hindered by the rotor. The high weight of the rotor would furthermore make handling during assembly more difficult.

BRIEF DESCRIPTION OF THE DRAWINGS

Further details of illustrative embodiments of the invention will be given below with reference to the attached drawings, in which.

DETAILED DESCRIPTION OF THE PREFERRED EMBODIMENTS

Figure 1:
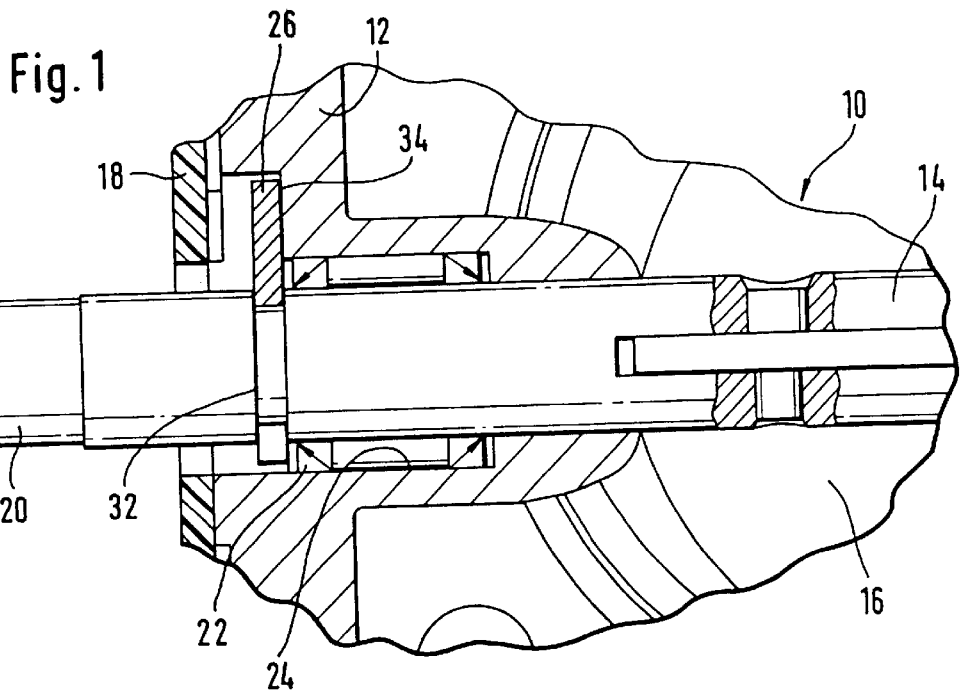
FIG. 1 shows a cross section through a throttle body.

The throttle body 10 shown in FIG. 1 essentially comprises a throttle housing 12, a throttle-butterfly shaft 14 mounted in the latter, said shaft carrying the throttle butterfly 16, a potentiometer, of which only the potentiometer plate 18 fixed and centered on the housing is shown, and a rotor (not shown) of an electric drive motor, which can be press-fitted directly on to a fitting region 20 at the free end of the shaft 14. The housing can be closed by a cover (not shown) in the region of the drive motor.

The shaft 14 is supported in the housing 12 on both sides of the throttle butterfly 16 by means of a needle bearing arrangement 22, which can, for example, comprise a needle bush running directly in a housing bore 24 and on the shaft 14. To secure the shaft 14 axially with a defined axial play, a retaining washer 26 is provided (see also FIG. 2 or 3), which has a keyhole-shaped opening 28, the edge 30 of which interacts in the narrow region with a circumferential groove 32 in the shaft 14. The width of the circumferential groove 32 is chosen in such a way in relation to the thickness of the retaining washer 26 that the desired axial play is obtained. The axial position of the shaft 14 is defined by a contact surface 34 on the housing, against which the retaining washer 26 can be screwed by means of screws (not shown). Because the retaining washer 26 is not very thick, countersunk screws, which can transmit the necessary holding forces to the retaining washer 26 via tapered holes 36, are suitable as screws.

Figure 2:
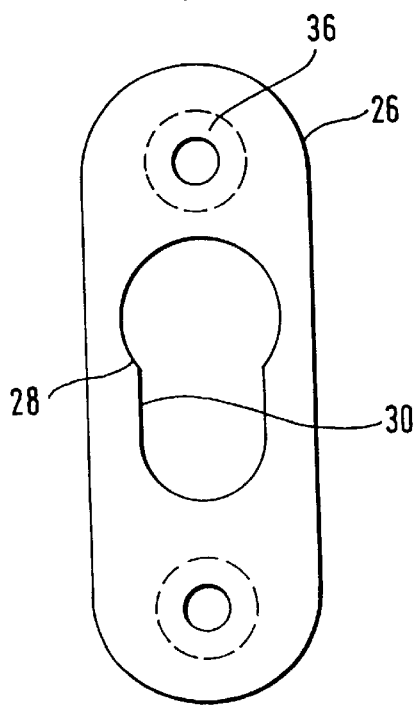
FIG. 2 is a view of the axial retention means for the throttle-butterfly shaft shown in FIG. 1.
Figure 3:
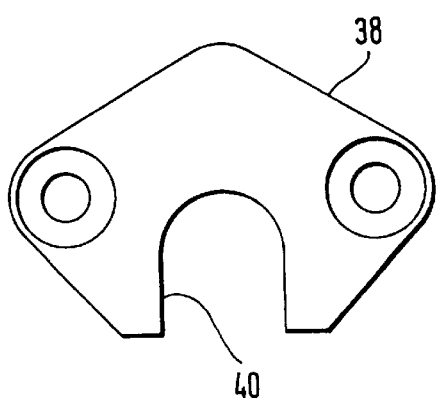
FIG. 3 shows an alternative axial retention means for the throttle-butterfly shaft shown in FIG. 1.

In addition to the embodiment shown in FIG. 2, in which the opening is in the form of a continuous keyhole, a variant, shown in FIG. 3, of a retaining washer 38 with a keyhole opening 40 open at one end is also conceivable.

Figure 4:
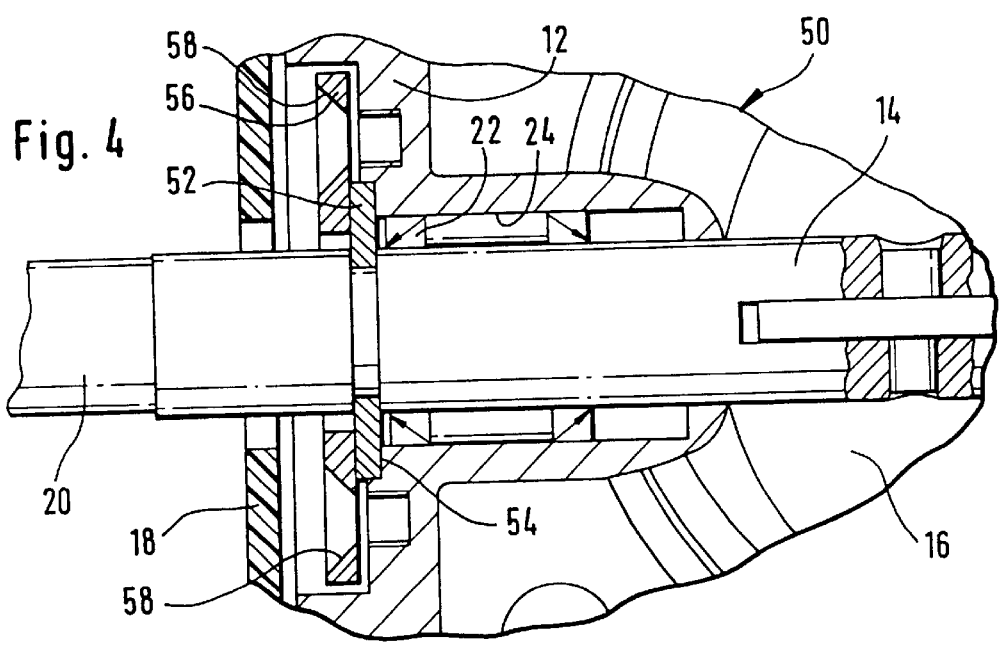
FIG. 4 shows a cross section of another embodiment of a throttle body.

Another embodiment of a throttle body 50 is shown in FIG. 4. With the exception of the axial retention means, this throttle body 50 corresponds to the throttle body 10 described above, for which reason identical parts are provided with identical reference numerals.

Figure 5A:
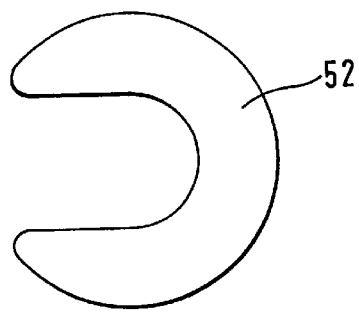
FIG. 5a is a first view of the axial retaining washer for the throttle-butterfly shaft shown in FIG. 4.
Figure 5B:
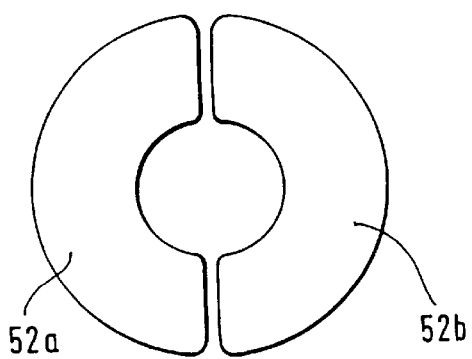
FIG. 5b is a second view of the axial retaining washer for the throttle-butterfly shaft shown in FIG. 4.

Instead of a one-piece retaining washer screwed directly to the housing 12, the throttle body 50 has a C-shaped retaining washer 52 (FIG. 5a), which is seated in the circumferential groove 32 in the shaft 14. The retaining washer 52 is supported axially against a housing offset 54 which defines the position of the shaft relative to the housing 12. The retaining washer 52 is fixed axially with the aid of a fastening plate 56 which, in turn, is screwed against the housing 12 by means of countersunk screws (not shown), which act on tapered holes 58 in the fastening plate 56. In the process, the retaining washer 52 is clamped between the offset 54 and the fastening plate 56. As an alternative, however, the retaining washer can also be formed by two half-shells 52a, 52b. (FIG. 5b).

Figure 6:
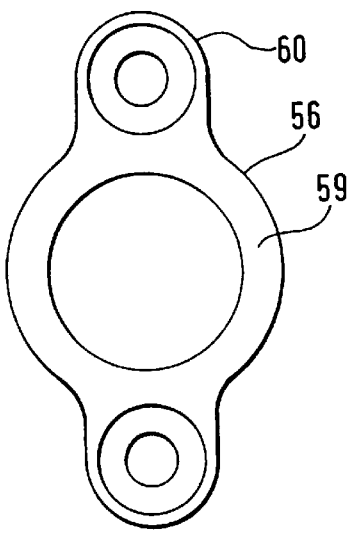
FIG. 6 is a view of the fastening plate for axial fixing in accordance with FIG. 4.

The fastening plate 56 is shown in FIG. 6. It essentially comprises an annular holding region 59, the inside diameter of which is larger than the outside diameter of the shaft but smaller than the outside diameter of the C-shaped retaining washer 52. Adjoining the annular region 59 are two hole regions 60, in which the tapered holes 58 are arranged.

Figure 7:
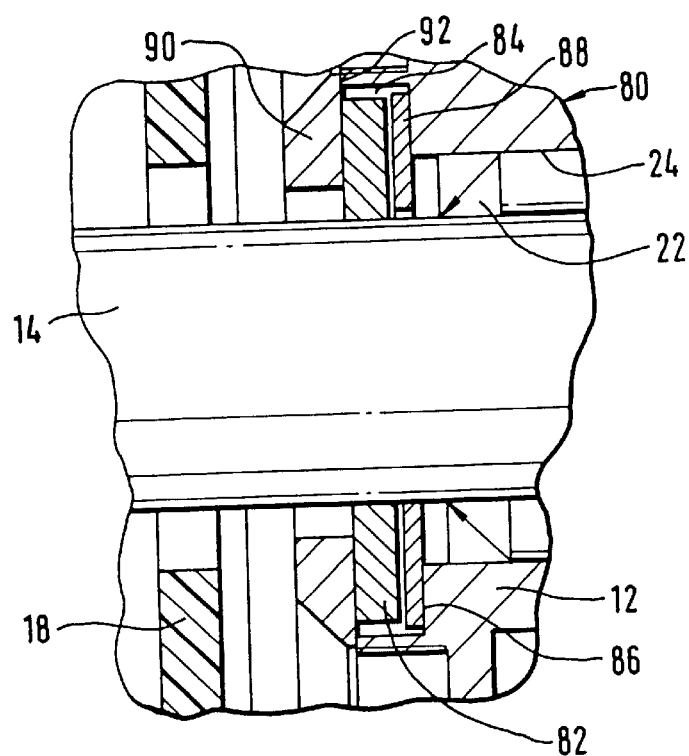
FIG. 7 is a section through another embodiment of a throttle body.

Another variant of a throttle body 80 is shown in FIG. 7. In this throttle body, the axial play is not provided between a retaining washer 82 and a circumferential groove in the shaft 14 but is obtained at the housing by means of the difference between the width of a gap 84 and the thickness of the retaining washer 82, which is welded as a simple ring on to the outer circumference of the shaft 14. The gap 84 is bounded by a contact disk 88 provided on a housing offset 86 and by a fastening plate 90, which is screwed against a contact surface 92 on the housing 12.

Figure 8:
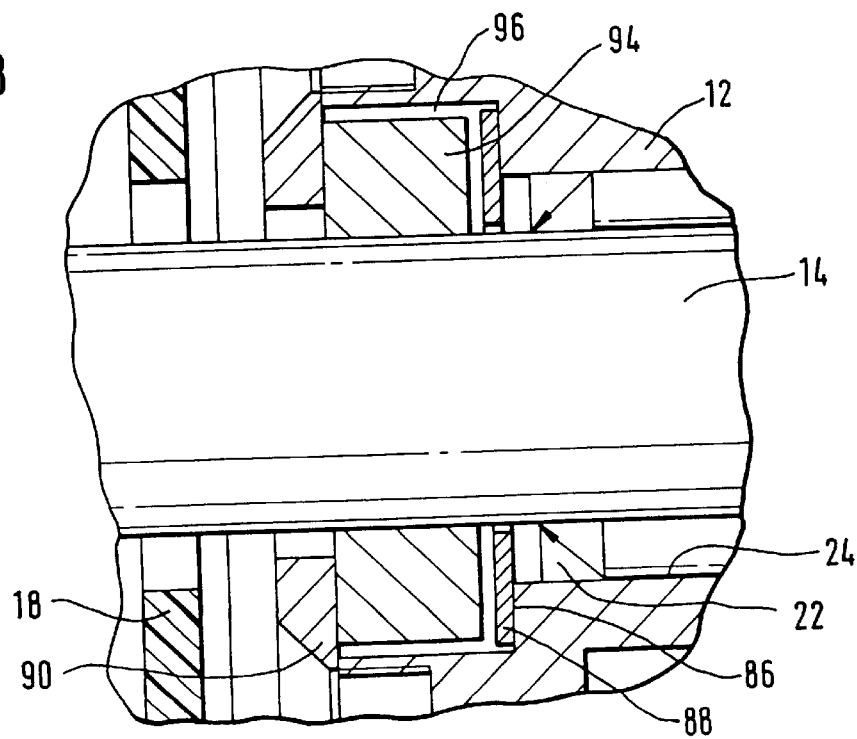
FIG. 8 shows a modified embodiment of the throttle body shown in FIG. 7.

FIG. 8 shows a modification of the throttle body 80, in which a somewhat thicker retaining washer 94 is provided, which is seated firmly on the shaft 14 not by means of a welded joint but by means of a press fit. The increased thickness of the retaining washer 94, which necessitates a correspondingly wider gap 96, is necessary to allow a secure press fit.

Both in the design of the throttle body 80 illustrated in FIG. 7 and that illustrated in FIG. 8, the fastening element 90 corresponds to the fastening plate 56 shown in FIG. 6, although it is not used to clamp the retaining washer but merely forms an axial stop surface given a corresponding displacement of the shaft 14. In all the embodiments described above, the potentiometer plates 18 are fastened and centered on the housing 12 in a position which is axially close to the needle bearing arrangements 22, this being made possible by the fact that the axial retaining means take up only a little axial installation space. The proximity of the potentiometer to the bearing arrangement ensures that if the shaft 14 is excited so as to vibrate, the amplitudes are only small, thus making possible accurate actual-value detection.

The throttle bodies 10, 50, 80 are assembled by first of all inserting the shaft 14 into the bearings 22 in the housing 12. The retaining washer 26, 52 or 82 is here already seated on the shaft 14 and limits the extent of axial insertion by coming up against the contact surface 34, the housing offset 54 or the contact disk 88. The throttle butterfly 16 is then installed and the shaft is fixed axially by screwing on the retaining washer 26 or the fastening element 56 or 90. In the next step, the potentiometer plate 18 is fixed in a centered position on the housing 12. The associated slider can then be fixed on the shaft. Finally, the rotor of the drive motor is press-fitted on to the holder 20 and the housing is closed by means of a cover. In this assembly method, all operations with the exception of the fitting of the throttle butterfly on the shaft, can be carried out from the rotor side, resulting in a simple assembly sequence.

Although both the axial retention means and the potentiometer 18 and rotor are arranged on one side of the throttle butterfly 16, the length of the shaft is only relatively short owing to the axially very narrow design of the axial retention means, the short length of the shaft ensuring high rigidity and hence helping to reduce vibration. The large axial contact surfaces nevertheless allow low unit surface loads, with the result that there is little wear despite the large mass of the rotor. Since only a few dimensions are involved, the accumulated tolerances allow precise maintenance of the axial play during manufacture.

We claim:

1. A throttle body with a Torquer drive, in which a rotor of an electric drive motor is press-fitted directly on to a shaft (14) of a throttle butterfly (16), an axial retention means, said axial retention means being a retaining washer (26; 52; 82; 94) and provided between the throttle butterfly (16) and the rotor, said retaining washer being fixed axially on one of the shaft (14) or a throttle housing (12) and engaging in a gap (32; 84; 96) on the other one, and two housing-side axial contact surfaces of the retaining washer (26; 52; 82; 94) being formed by a fastening plate (26; 56; 90) screwed to the housing (12) and by a stop (34; 54; 88) provided on the housing (12).

2. The throttle body as claimed in claim 1, wherein the retaining washer (26; 52) is seated on the shaft (14) in a circumferential groove (32) comprising said gap and is fixed without axial play on the housing side by the fastening plate (26; 56).

3. The throttle body as claimed in claim 2, wherein the retaining washer (52) is formed as a C washer and insertable laterally into the groove (32).

4. The throttle body as claimed in claim 2, wherein the retaining washer (52) is formed in two parts of half-shells (52*a*, 52*b*).

5. The throttle body as claimed in claim 2, wherein the fastening plate and the retaining washer (26) are formed in one-piece, and wherein a shaft opening (28; 40) is formed as a continuous or discontinuous keyhole.

6. The throttle body as claimed in claim 1, wherein said retaining washer (82; 94) is fixed axially on the shaft circumference and the gap (84; 96) is at the housing (12), said gap being defined by an axial stop (88) and one flank of the fastening plate (90).

7. The throttle body as claimed in claim 6, wherein said axial stop is provided with a contact disk (88).

8. The throttle body as claimed in claim 1, wherein the fastening plate (26; 56; 90) is fixed to the housing (12) by a plurality of screws.

9. The throttle body as claimed in claim 1, further comprising a potentiometer (18) for detecting a position of the throttle butterfly (16) between the axial retention means and the rotor.

10. The throttle body as claimed in claim 9, wherein said potentiometer has a potentiometer plate (18) and a potentiometer slider, said potentiometer plate is fixed to the housing (12) and the potentiometer slider is fixed to the shaft (14).

11. A method for assembling a throttle body (10; 50; 80) in accordance with claim 1, wherein the throttle body is first fully preassembled, and comprising the step of press-fitting the rotor on to the shaft (14) before the throttle housing (12) is closed.

* * * * *